(12) United States Patent
Jeong

(10) Patent No.: US 10,573,915 B2
(45) Date of Patent: Feb. 25, 2020

(54) MEMBRANE ELECTRODE ASSEMBLY AND FUEL CELL INCLUDING THE SAME

(71) Applicant: Hyundai Motor Company, Seoul (KR)

(72) Inventor: Byeong-Heon Jeong, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 588 days.

(21) Appl. No.: 15/289,631

(22) Filed: Oct. 10, 2016

(65) Prior Publication Data

US 2017/0263965 A1    Sep. 14, 2017

(30) Foreign Application Priority Data

Mar. 10, 2016 (KR) .......................... 10-2016-0028790

(51) Int. Cl.
*H01M 8/0273* (2016.01)
*H01M 8/1018* (2016.01)
*H01M 8/1006* (2016.01)
*H01M 8/0276* (2016.01)

(52) U.S. Cl.
CPC ....... *H01M 8/1006* (2013.01); *H01M 8/0273* (2013.01); *H01M 8/0276* (2013.01); *H01M 8/1018* (2013.01); *H01M 2008/1095* (2013.01)

(58) Field of Classification Search
CPC ............. H01M 8/1006; H01M 8/1018; H01M 8/0276; H01M 8/0273; H01M 2008/1095
See application file for complete search history.

(56) References Cited

U.S. PATENT DOCUMENTS

| 2003/0108783 A1* | 6/2003 | Resto ................. H01M 8/0271 429/480 |
| 2013/0177832 A1* | 7/2013 | Tsubosaka .......... H01M 8/0271 429/480 |

FOREIGN PATENT DOCUMENTS

| JP | 2004-186041 A | 7/2004 |
| JP | 2004-200153 A | 7/2004 |
| JP | 2008-041337 A | 2/2008 |
| JP | 2009-009715 A | 1/2009 |
| JP | 2009-181951 A | 8/2009 |
| JP | 2012-221651 A | 11/2012 |
| KR | 10-2000-0059873 A | 10/2000 |
| KR | 10-0836417 B1 | 6/2008 |

* cited by examiner

*Primary Examiner* — Miriam Stagg
*Assistant Examiner* — Lilia Nedialkova
(74) *Attorney, Agent, or Firm* — Morgan, Lewis & Bockius LLP

(57) ABSTRACT

A membrane electrode assembly includes a polymer electrolyte membrane; a first electrode layer disposed on an upper surface of the polymer electrolyte membrane; and a second electrode layer disposed on a lower surface of the polymer electrolyte membrane. At least one end of the polymer electrolyte membrane is bent upward along a side of the first electrode layer and extends to an upper surface of the first electrode layer or is bent downward along a side of the second electrode layer and extends to a lower surface of the second electrode layer.

17 Claims, 26 Drawing Sheets

A'-A

MEMBRANE ELECTRODE ASSEMBLY AND FUEL CELL INCLUDING THE SAME

CROSS REFERENCE TO RELATED APPLICATION

The present application claims the benefit of priority to Korean Patent Application No. 10-2016-0028790 filed on Mar. 10, 2016, the entirety of which is incorporated herein for all purposes by this reference.

TECHNICAL FIELD

The present disclosure relates to a membrane electrode assembly and a fuel cell including the same, and, more particularly, to a membrane electrode assembly and a fuel cell including the same having a self-humidifying capability for overcoming the limitation of low humidification, thereby achieving sufficient humidification therein and preventing moisture from diffusing to the outside through an electrolyte membrane.

BACKGROUND

A proton exchange membrane fuel cell (PEMFC) is a fuel cell that incorporates a polymer membrane, having a proton exchange function, as an electrolyte. The PEMFC may be operated at low temperatures, has high efficiency and high current and power density, and has a fast reaction time to a change in load while starting up in a short time, compared to other fuel cells. Accordingly, PEMFCs have been recently used as fuel cells for hydrogen-powered vehicles.

A PEMFC stack typically consists of hundreds of unit cells. Each of the unit cells is an electricity generating element for the fuel cell, and includes a membrane electrode assembly (MEA) formed by bonding anode and cathode electrodes to a polymer electrolyte membrane, a gas diffusion layer (GDL), and a separator. An electrochemical reaction takes place in the electricity generating element in order to produce electric power. The electrochemical oxidation of hydrogen as a fuel occurs in the anode of the MEA, and the electrochemical reduction of oxygen as an oxidant occurs in the cathode thereof. In this case, electrical energy is generated due to the movement of electrons generated by the reaction, the protons generated in the anode migrate to the cathode through the polymer electrolyte, and oxygen combines with the protons in the cathode to produce water.

Although a variety of research on polymer electrolyte membranes has been performed to date, NAFION® developed in the early 1960s is still widely used as a proton exchange membrane for a fuel cell. NAFION® is a branched polymer made by covalently bonding a sulfonic acid group to the side chain end of fluorine-substituted alkyl ether in the polymer main chain of fluorinated hydrocarbon similar to TEFLON®. Here, the sulfonic acid group is rehydrated by water molecules so that ionic conductivity is activated. That is, protons are able to freely move in the electrolyte due to water molecules present in electrolyte membranes, and high ionic conductivity is thus exhibited.

A hydrogen-powered vehicle may include a fuel cell stack, balance of plant components (an air compressor, a heat exchanger, etc.), a fuel supply device, an auxiliary power source, a motor, a motor controller, etc.

An MEA affecting the performance of a fuel cell stack must have a certain level of relative humidity over a wide range of operating temperatures. To this end, a humidifier may be provided in an air supply system outside the stack.

A gas-to-gas membrane humidification method is an external humidification method used to humidify a fuel cell stack for a vehicle. Since this method recovers and reuses moisture and heat discharged from the stack, it has an advantage in that separate energy sources or mechanisms are not required.

However, techniques for preventing permeation of gases other than moisture present in wet air are required in order for a gas-to-gas membrane humidifier to have moisture selectivity as its basic characteristic. Therefore, the above method is disadvantageous in a layout of an engine room due to an increase in cost necessary for an external humidifier and an increase in volume. In addition, since the membrane humidifier uses a polymer membrane, it is difficult to control a supply amount of water vapors at a given temperature. Furthermore, since a hydrogen supply system does not have a separate humidifier, it should rely on relative humidity produced in a cathode being inversely diffused to an anode.

Accordingly, there is a problem in that the lack of proper humidity at an operating temperature having low relative humidity may cause the dry-out of an MEA and the performance deterioration of a fuel cell. In particular, severe and long-term drying in the stack may cause irreversible damage to the MEA.

In addition, since a conventional MEA has a structure in which the side end of a polymer electrolyte membrane disposed between anode and cathode electrodes is exposed to the outside, water molecules are diffused to the outside from the side of the polymer electrolyte membrane, thereby corroding the exterior of the stack and deteriorating electrical insulation safety.

The foregoing is intended merely to aid in the understanding of the background of the present disclosure, and is not intended to mean that the present invention falls within the purview of the related art that is already known to those skilled in the art.

SUMMARY

Accordingly, the present disclosure has been devised keeping in mind the above problems occurring in the related art, and the present disclosure is intended to propose a membrane electrode assembly and a fuel cell including the same, which are capable of having a self-humidifying capability for overcoming the limitation of low humidification, in order to achieve sufficient humidification therein and prevent water molecules from diffusing to the outside through an electrolyte membrane.

In accordance with one aspect of the present disclosure, a membrane electrode assembly includes a polymer electrolyte membrane; a first electrode layer disposed on an upper surface of the polymer electrolyte membrane; and a second electrode layer disposed on a lower surface of the polymer electrolyte membrane. At least one end of the polymer electrolyte membrane is bent upward along a side of the first electrode layer and extends to an upper surface of the first electrode layer or is bent downward along a side of the second electrode layer and extends to a lower surface of the second electrode layer.

A first end of the polymer electrolyte membrane may be bent upward along the side of the first electrode layer and extend to the upper surface of the first electrode layer, and a second end of the polymer electrolyte membrane may be bent downward along the side of the second electrode layer and extend to the lower surface of the second electrode layer.

The sides of the first and second electrode layers may be aligned vertically with the bent portions of the polymer electrolyte membrane respectively adjacent thereto.

One end of the polymer electrolyte membrane may be bent upward to extend to the upper surface of the first electrode layer or downward to extend to the lower surface of the second electrode layer.

Two ends of the polymer electrolyte membrane may be bent in the same direction so as to extend to the upper surface of the first electrode layer or the lower surface of the second electrode layer.

At least one end of the polymer electrolyte membrane may be horizontally divided into upper and lower portions, the upper portion being bent upward along the side of the first electrode layer and extending to the upper surface of the first electrode layer, and the lower portion being bent downward along the side of the second electrode layer and extending to the lower surface of the second electrode layer.

The polymer electrolyte membrane may include a first electrolyte membrane facing the first electrode layer and a second electrolyte membrane facing the second electrode layer; and at least one end of the first electrolyte membrane may be bent upward along the side of the first electrode layer and extend to the upper surface of the first electrolyte layer, and at least one end of the second electrolyte membrane may be bent downward along the side of the second electrode layer and extend to the lower surface of the second electrode layer.

In accordance with another aspect of the present disclosure, a fuel cell includes: a membrane electrode assembly including a polymer electrolyte membrane, a first electrode layer disposed on an upper surface of the polymer electrolyte membrane, and a second electrode layer disposed on a lower surface of the polymer electrolyte membrane, at least one end of the polymer electrolyte membrane being bent upward along a side of the first electrode layer and extending to an upper surface of the first electrode layer or being bent downward along a side of the second electrode layer and extending to a lower surface of the second electrode layer; and upper and lower separators disposed in respective upper and lower portions of the membrane electrode assembly, and comprising respective gaskets forming a sealed structure of the membrane electrode assembly.

The membrane electrode assembly may be disposed inside the sealed structure formed by the gaskets.

The fuel cell may further include a sub-gasket formed in an edge region of the membrane electrode assembly. The sub-gasket may seal a side of the membrane electrode assembly, and the bent end of the polymer electrolyte membrane extending to an upper or lower surface of the first or second electrode layer may be exposed to the outside of the sub-gasket.

The membrane electrode assembly and the sub-gasket may be integrally formed.

The fuel cell may further include gas diffusion layers disposed between the membrane electrode assembly and the respective upper and lower separators.

The membrane electrode assembly and the gas diffusion layers may be integrally formed.

Water molecules may be supplied into the gas diffusion layers from the end of the membrane electrode assembly extending to the upper surface of the first electrode layer or the lower surface of the second electrode layer.

The fuel cell may further include a frame bonded to a lamination structure of the membrane electrode assembly and the gas diffusion layers so as to fix the lamination structure.

The membrane electrode assembly, the gas diffusion layers, and the frame may be integrally formed.

As apparent from the above description, in accordance with the membrane electrode assembly and the fuel cell including the same, water generated by the electromechanical reaction in the fuel cell can be autonomously supplied to the selected one of the anode and the cathode, or to both of the anode and the cathode. Therefore, it is possible to prevent the dry-out of the membrane electrode assembly, and thus to reduce the performance deterioration of the fuel cell.

In addition, in accordance with the membrane electrode assembly and the fuel cell including the same, moisture can be supplied without an external humidifier used to supply humidified air to the membrane electrode assembly. Therefore, costs can be reduced since the humidifier is not necessary.

In addition, in accordance with the membrane electrode assembly and the fuel cell including the same, it is possible to prevent water molecules generated in the reaction region from diffusing to the outside of the fuel cell through the electrolyte membrane. Therefore, it is possible to prevent a short circuit from occurring between a plurality of unit cells in the stack, and to prevent the outer corrosion of the stack due to moisture.

In addition, in accordance with the membrane electrode assembly and the fuel cell including the same, it is possible to reduce the size of the electrolyte membrane disposed in a region other than the reaction area in the related art by allowing the membrane electrode assembly to be arranged within the gasket line of the separator. Therefore, it is possible to reduce costs in terms of materials.

In addition, in accordance with the membrane electrode assembly and the fuel cell including the same, the sub-gasket can be integrated with the gas diffusion layers by roll laminating or thermal compression through hot pressing in the state in which the electrolyte membrane is bent.

In addition, in accordance with the membrane electrode assembly and the fuel cell including the same, the membrane electrode assembly can be integrated by bonding the gas diffusion layers in the state in which the electrolyte membrane is bent, and by forming the polymer frame with an injection molding method. Therefore, it is possible to improve productivity of the stack.

In addition, in accordance with the membrane electrode assembly and the fuel cell including the same, the unit cells can be integrated with the membrane electrode assembly manufactured in a tailored form so as to be suitable for user's demand characteristics or the gas diffusion layers, even though the supply amount of water vapors varies according to specifications of the stack and the operating system.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF PREFERRED EMBODIMENTS

A membrane electrode assembly and a fuel cell including the same according to exemplary embodiments in the present disclosure will be described below with reference to the accompanying drawings.

Figure 1:
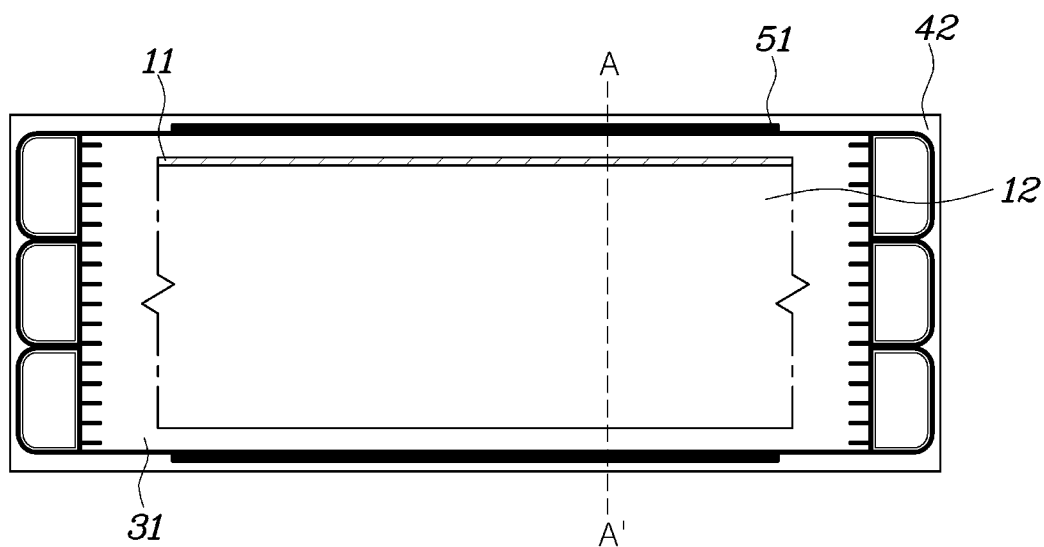
FIG. 1 is a top view illustrating a portion of a fuel cell including a membrane electrode assembly according to an exemplary embodiment in the present disclosure.
Figure 2:
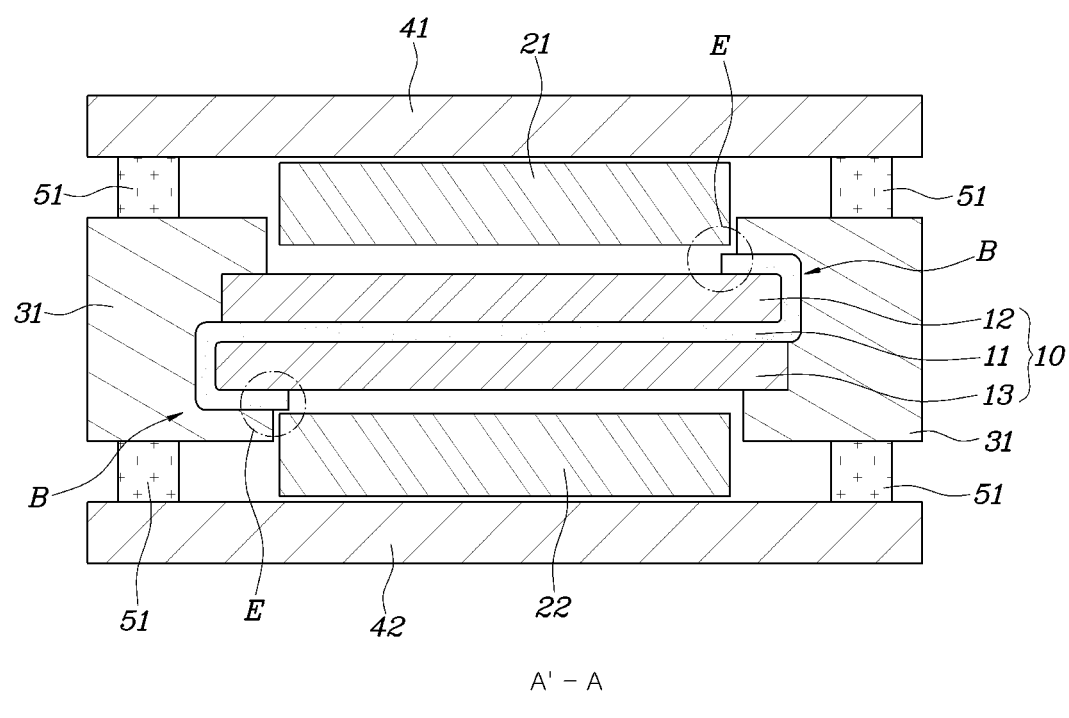
FIG. 2 is a cross-sectional view taken along the line A-A' of FIG. 1.

FIG. 1 is a top view illustrating a portion of a fuel cell including a membrane electrode assembly according to an exemplary embodiment. FIG. 2 is a cross-sectional view taken along the line A-A' of FIG. 1.

FIG. 1 is a schematic illustration where partial components are removed from the fuel cell including a membrane electrode assembly so as to more easily illustrate the inner arrangement structure between two separators. That is, FIG. 1 illustrates a state in which an upper separator 41, a gasket 51 formed on the surface of the upper separator 41, and an upper gas diffusion layer 21 illustrated in FIG. 2 are removed from the fuel cell. In addition, FIG. 1 illustrates only a portion of a sub-gasket 31 formed along the circumference of a membrane electrode assembly 10.

However, the structure illustrated in FIGS. 1 and 2 is one of various exemplary embodiments in the present disclosure and is merely an example adopted for convenience of description and ease of understanding. Accordingly, it will be understood by those skilled in the art that various changes in form and details may be made therein without departing from the spirit and scope of the present disclosure.

Referring to FIGS. 1 and 2, the membrane electrode assembly 10 according to the exemplary embodiment includes a polymer electrolyte membrane 11, a first electrode layer 12 formed on the upper surface of the polymer electrolyte membrane 11, and a second electrode layer 13 formed on the lower surface of the polymer electrolyte membrane 11.

In the embodiment, the first electrode layer 12 may form an anode electrode using a catalyst as material for the electrochemical oxidation of hydrogen as a fuel, and the second electrode layer 13 may form a cathode electrode using a catalyst as material for the electrochemical reduction of oxygen. The ionic conductivity of the polymer electrolyte membrane 11 is activated by moisture, and protons generated in the anode migrate to the cathode to produce water by combination with oxygen.

In various exemplary examples in the present disclosure, at least a portion of side ends of the polymer electrolyte membrane 11 has a bent portion (B) bent upward or downward, and a side end (E) of the polymer electrolyte membrane 11 may extend to the upper surface of the first electrode layer 12 formed on the upper surface thereof or to the lower surface of the second electrode layer 13 formed on the lower surface thereof by the bent portion (B). Finally, the side end (E) of the polymer electrolyte membrane 11, which is bent and extends by the bent portion (B), is disposed on the upper surface of the first electrode layer 12 or the lower surface of the second electrode layer 13.

In the various examples, since the side end of the polymer electrolyte membrane 11 is bent and extends toward and around the side edges of the anode or the cathode, water molecules emitted from the side surface of the polymer electrolyte membrane 11 may be diffused to the anode or the cathode in order to autonomously supply humidified gases.

In order to realize the membrane electrode assembly 10 having such a structure, the polymer electrolyte membrane 11 may have a slightly larger area than the first and second electrode layers 12 and 13 formed on the upper and lower surfaces thereof.

Referring to FIG. 1, the fuel cell including the membrane electrode assembly 10 according to the exemplary embodiment may include separators 41 and 42 which are respectively disposed at the upper and lower portions of a structure, including the membrane electrode assembly 10 and gas diffusion layers 21 and 22 disposed at the respective upper and lower portions of the membrane electrode assembly 10, and allows the structure to have an airtight or watertight structure by the gasket 51.

In the embodiment, the sub-gasket 31 may be formed in the edge region of the membrane electrode assembly 10, and the gasket 51 may come into close contact with the sub-gasket 31 so as to realize an airtight or watertight structure.

In the embodiment, the membrane electrode assembly 10 is located inside the line of the gasket 51 when the membrane electrode assembly 10 is assembled with the separators 41 and 42, and thus forms a structure in which the polymer electrolyte membrane 11 of the membrane electrode assembly 10 does not protrude outside of the fuel cell. That is, water molecules generated in a reaction region may be basically prevented from diffusing to the outside of the unit cell.

The structure illustrated in FIGS. 1 and 2 is an example of the membrane electrode assembly 10 and the fuel cell including the same, and may be modified in various forms without departing from the scope and spirit of the present disclosure.

FIGS. 3 to 8, 9A and 9B are cross-sectional views illustrating various examples of membrane electrode assemblies according to exemplary embodiment in the present disclosure.

Figure 3:
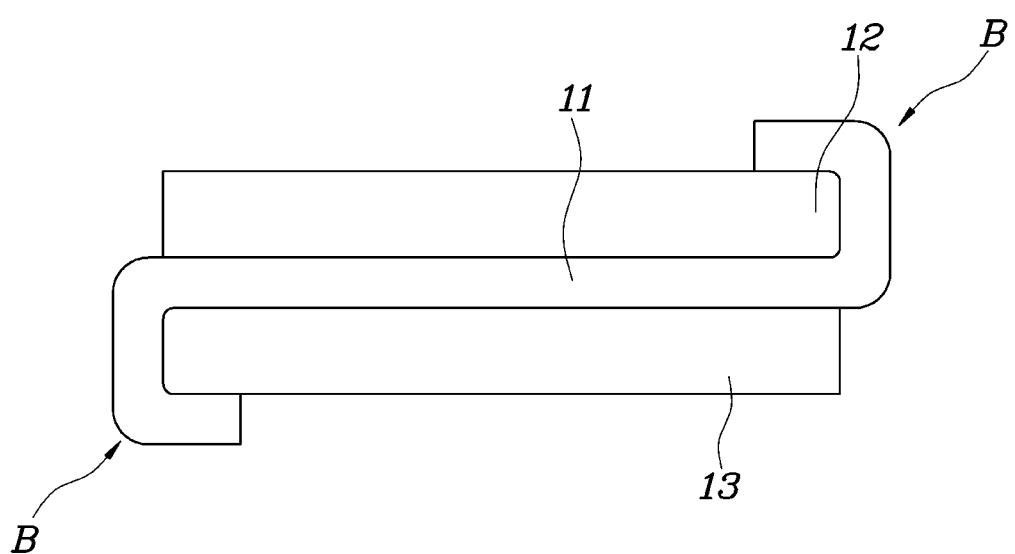
FIGS. 3 to 8, 9A and 9B are cross-sectional views illustrating various exemplary embodiments of membrane electrode assemblies.

First, a membrane electrode assembly of FIG. 3 is similar to that illustrated in FIG. 2. In FIG. 3, one side end of a polymer electrolyte membrane 11 is bent (B) upward along the end of a first electrode layer 12 and extends to the upper surface of the first electrode layer 12. The other side end of the polymer electrolyte membrane 11 facing the one side end is bent (B) downward along the end of a second electrode layer 13 and extends to the lower surface of the second electrode layer 13. When the first electrode layer 12 forms an anode and the second electrode layer 13 forms a cathode, the membrane electrode assembly illustrated in FIG. 3 has a structure that autonomously supplies water molecules to both of the anode and the cathode.

Figure 4:
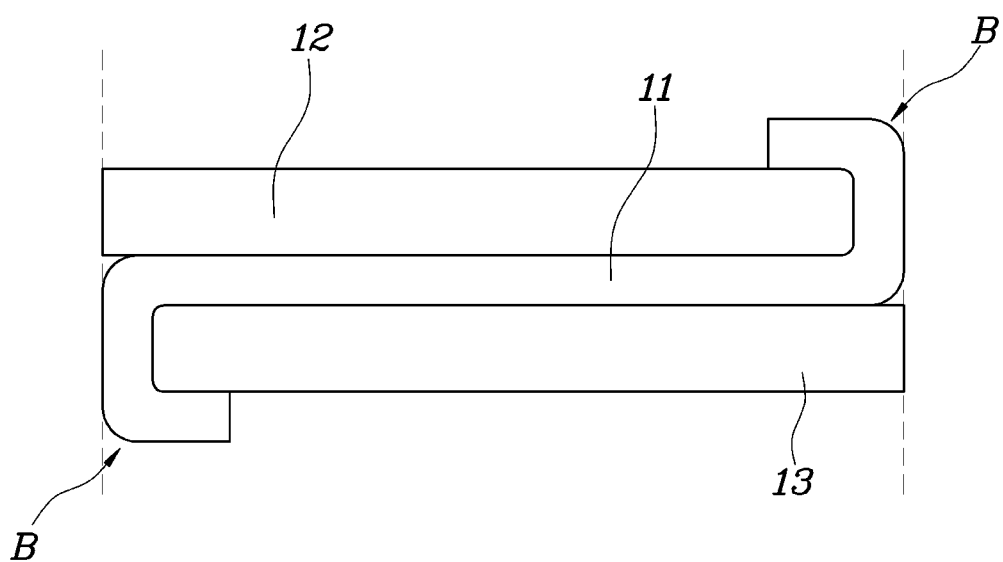

Next, a membrane electrode assembly of FIG. 4 is similar to that illustrated in FIG. 3. In FIG. 4, one side end of a polymer electrolyte membrane 11 is bent (B) upward along the end of a first electrode layer 12 and extends to the upper surface of the first electrode layer 12. The other side end of the polymer electrolyte membrane 11 facing the one side end is bent (B) downward along the end of a second electrode layer 13 and extends to the lower surface of the second electrode layer 13. However, the membrane electrode assembly of FIG. 4 differs from that of FIG. 3 in terms of the alignment structure of the first and second electrode layers 12 and 13 in which the side ends of the first and second electrode layers 12 and 13 are aligned vertically at one of their respective ends with side ends formed by the bent portions (B) of the polymer electrolyte membrane 11 respectively adjacent thereto. In other words, the first electrode layer 12 may be laterally displaced (e.g. by approximately the thickness of the polymer electrolyte membrane 11) with respect to the second electrode layer 13.

Figure 5:
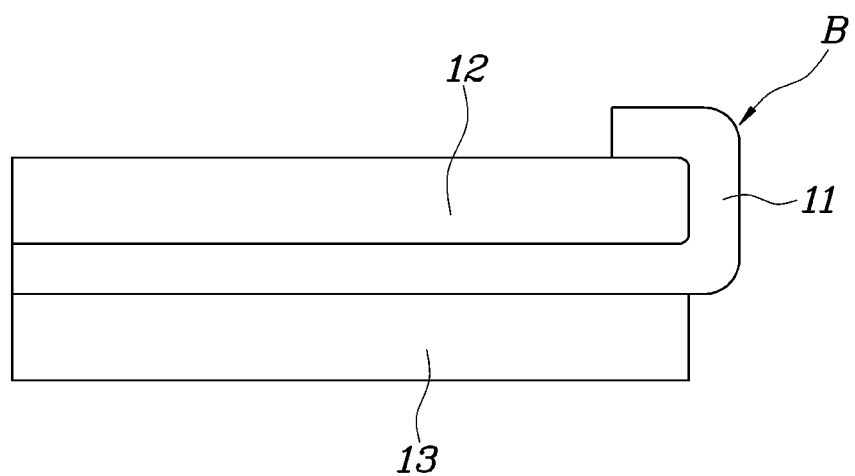
Figure 6:
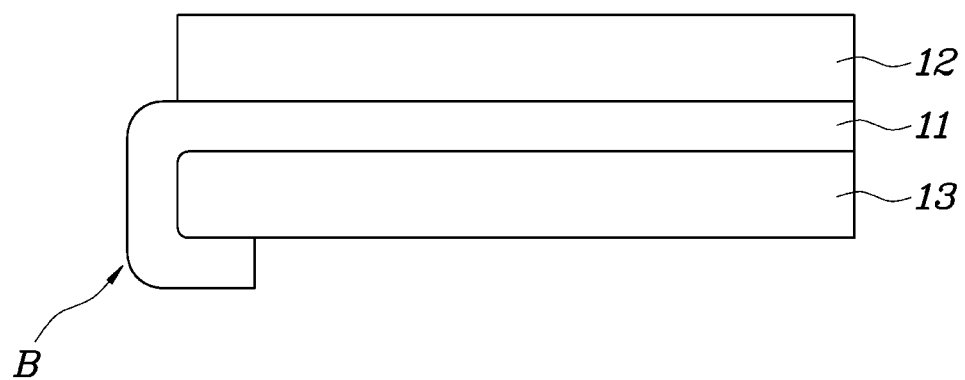

Next, in each membrane electrode assembly of FIGS. 5 and 6, one side end of a polymer electrolyte membrane 11 of a membrane electrode assembly 10 is bent (B) only to a first upper electrode layer 12 or only to a second lower electrode layer 13. The membrane electrode assembly has a structure that autonomously supplies water molecules to the selected one of the anode and the cathode.

Figure 7:
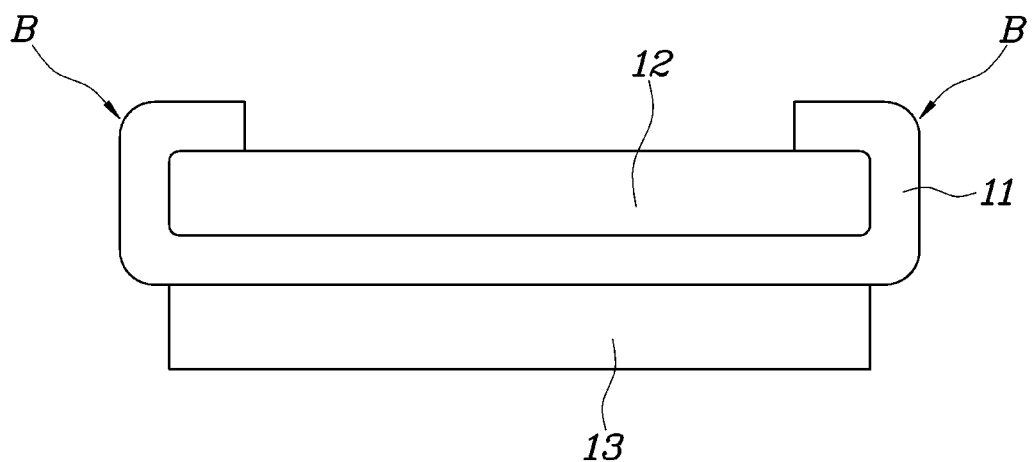
Figure 8:
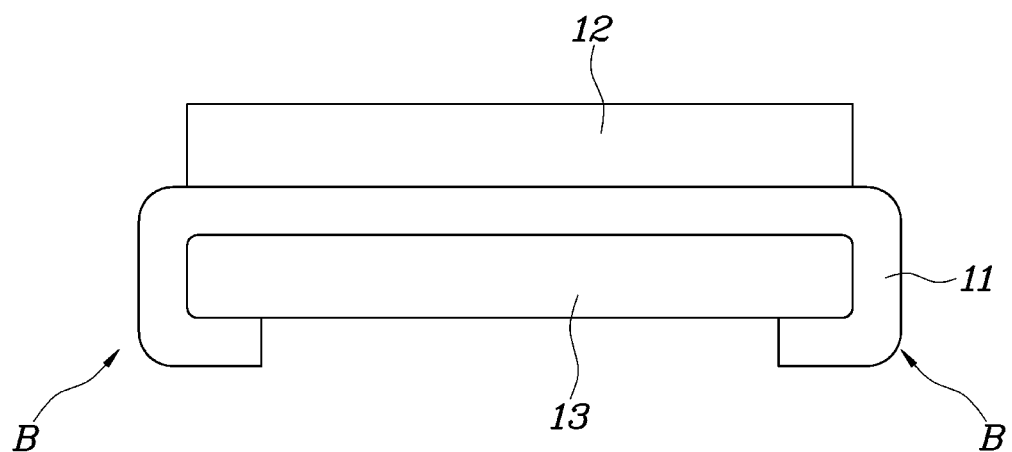

Next, in each membrane electrode assembly of FIGS. 7 and 8, both side ends of a polymer electrolyte membrane 11 of a membrane electrode assembly 10 are bent (B) only to a first upper electrode layer 12 or only to a second lower electrode layer 13. The membrane electrode assembly has a structure that autonomously supplies water molecules to the selected one of the anode and the cathode. Each membrane electrode assembly of FIGS. 7 and 8 has a self-humidification structure that supplies a larger amount of water molecules toward the associated first or second electrode layer 12 or 13, compared to that of FIGS. 5 and 6.

Figure 9A:
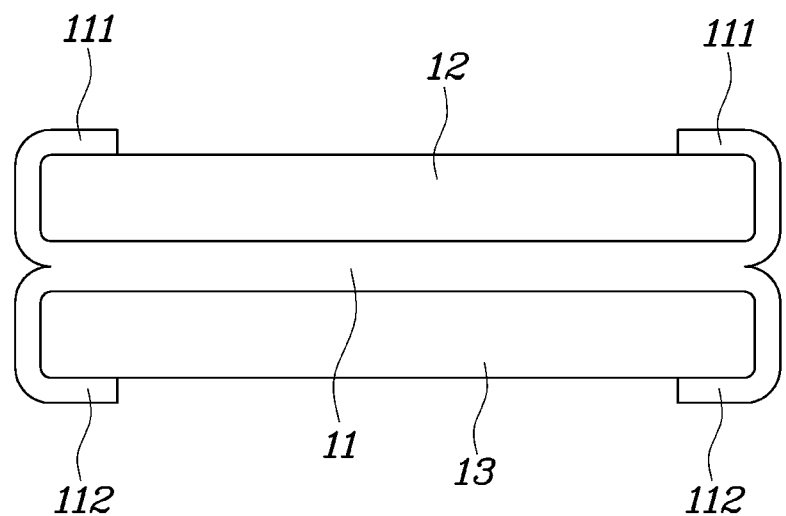
Figure 9B:
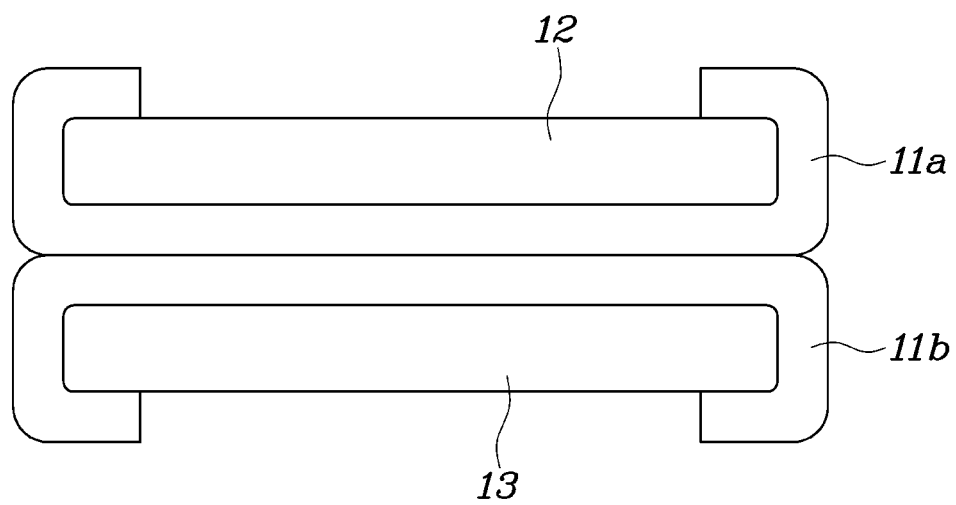

Next, in a membrane electrode assembly of FIGS. 9A and 9B, both side ends of a polymer electrolyte membrane 11 of a membrane electrode assembly 10 are bent (B) to a first upper electrode layer 12 and a second lower electrode layer 13. The membrane electrode assembly has a structure that autonomously supplies water molecules to both of the anode and the cathode.

In the membrane electrode assembly of FIG. 9A, both side ends of a polymer electrolyte membrane 11 are vertically divided in a thickness direction of the membrane electrode assembly 10, and the divided portions are respectively bent toward first and second electrode layers 12 and 13. Thus, the membrane electrode assembly has a structure that autonomously supplies water molecules to both of the anode and the cathode.

Illustratively, as shown in FIG. 9A, a first side end of the polymer electrolyte membrane 11 is divided in two partial first side end portions 111, 112. The two partial first side end portions 111, 112 may e.g. have a similar thickness, e.g. approximately half of the thickness of the polymer electrolyte membrane 11. An upper partial first side end portion 111 may be bent (B) only to the first upper electrode layer 12 and thus may cover a portion of an upper surface of the first electrode layer 12. A lower partial first side end portion 112 may be bent (B) only to the second electrode layer 13 and thus may cover a portion of a lower surface of the second electrode layer 13.

Furthermore, a second side end of the polymer electrolyte membrane 11 (which may be the opposite end with respect to the first side end) is divided in two partial second side end portions 111, 112. The two partial second side end portions 111, 112 may e.g. have a similar thickness, e.g. approximately half of the thickness of the polymer electrolyte membrane 11. An upper partial second side end portion 111 may be bent (B) only to the first upper electrode layer 12 and thus may cover a portion of an upper surface of the first electrode layer 12. A lower partial second side end portion 112 may be bent (B) only to the second electrode layer 13 and thus may cover a portion of a lower surface of the second electrode layer 13.

In addition, in the membrane electrode assembly of FIG. 9B, a polymer electrolyte membrane is divided into two membranes 11a and 11b. In the membrane electrode assembly of FIG. 9B, among the polymer electrolyte membranes 11a and 11b, both side ends of the polymer electrolyte membrane 11a, which directly faces a first electrode layer 12, are bent toward the first electrode layer 12, and both side ends of the polymer electrolyte membrane 11b, which directly faces a second electrode layer 13, are bent toward the second electrode layer 13. Thus, the membrane electrode assembly has a structure that autonomously supplies water molecules to both of the anode and the cathode.

Meanwhile, as illustrated in FIG. 2, the membrane electrode assembly 10 may further include an additional component such as a gas diffusion layer 21 or a sub-gasket 31 in order for the membrane electrode assembly to be applied to the fuel cell. In particular, the membrane electrode assembly 10 may be applied to the fuel cell in the state in which it is integrated with the gas diffusion layer 21 and the sub-gasket 31.

FIGS. 10A to 10C, 11A to 11C, 12A to 12C and 13A to 13C are views illustrating various examples in which a membrane electrode assembly a sub-gasket, and/or gas diffusion layers, and/or a polymer frame are integrated with each other according to the embodiment of the present invention.

Figure 10A:
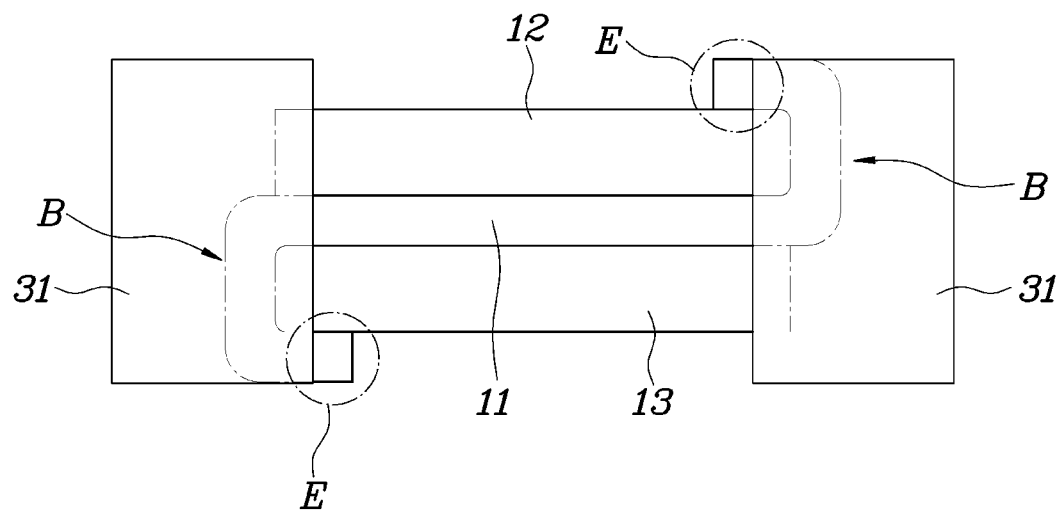
FIGS. 10A to 10C are cross-sectional views illustrating exemplary embodiments in which a membrane electrode assembly is integrated with a sub-gasket.
Figure 10B:
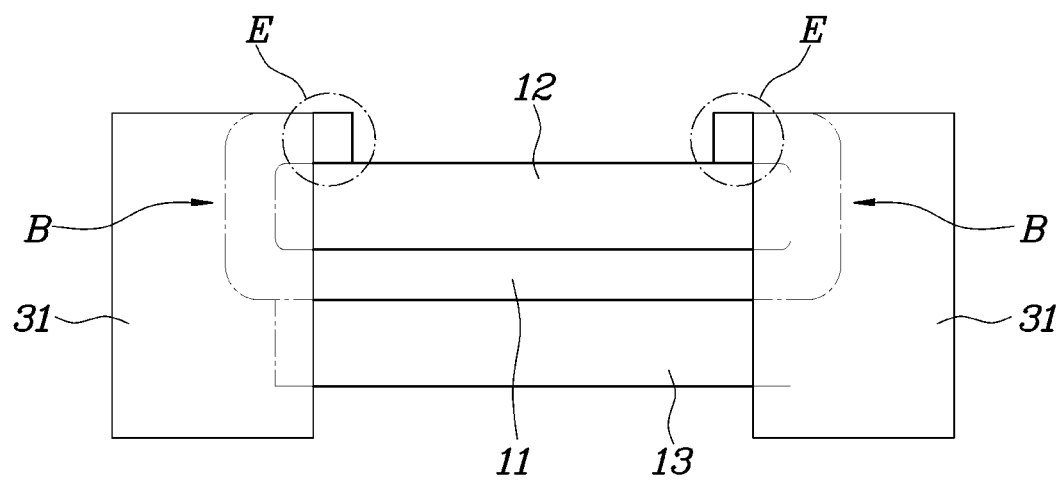
Figure 10C:
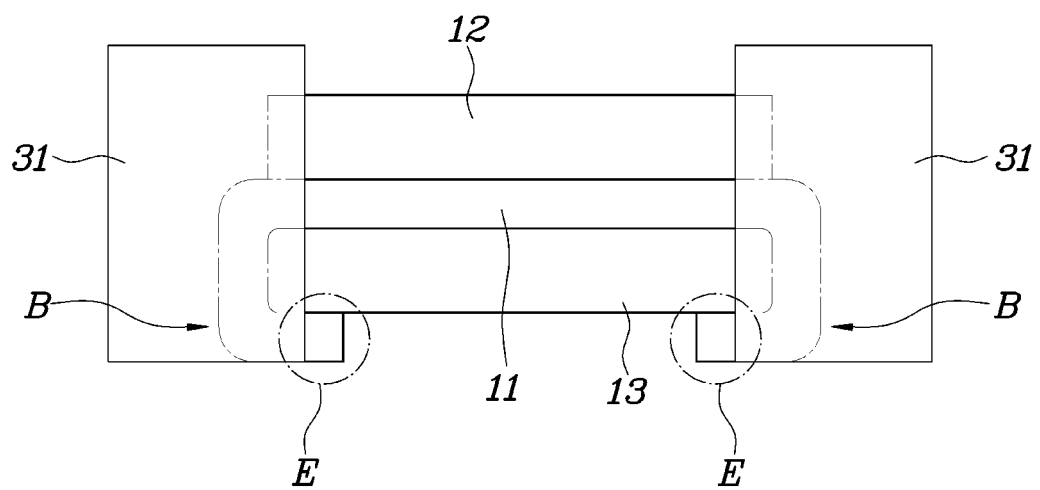

First, FIGS. 10A to 10C illustrate structures in which a membrane electrode assembly 10 is integrated with a sub-gasket 31 according to the embodiment of the present invention. FIG. 10A illustrates an example in which a polymer electrolyte membrane 11 of a membrane electrode assembly 10 is bent toward first upper and second lower electrode layers 12 and 13. FIG. 10B illustrates an example in which a polymer electrolyte membrane 11 of a membrane electrode assembly 10 is bent toward a first upper electrode layer 12. FIG. 10C illustrates an example in which a polymer electrolyte membrane 11 of a membrane electrode assembly 10 is bent toward a second lower electrode layer 13.

In FIGS. 10A to 10C, the sub-gasket 31 may be integrally bonded to the edge portion of the membrane electrode assembly 10, i.e., to the side end thereof. For example, the sub-gasket 31 may be bonded by a hot pressing or a roll laminating process.

As illustrated in FIGS. 10A to 10C, the sub-gasket 31 may be bonded to the edge portion of the membrane electrode assembly 10 so as to seal the side end of the membrane electrode assembly 10 without exposing the same. However, the end (E) of the polymer electrolyte membrane 11, which is bent and extends to the first or second electrode layer 12 or 13, may be exposed to the outside of the sub-gasket 31 so as to realize self-humidification by supplying water vapors to the diffusion region of hydrogen or air.

Figure 11A:
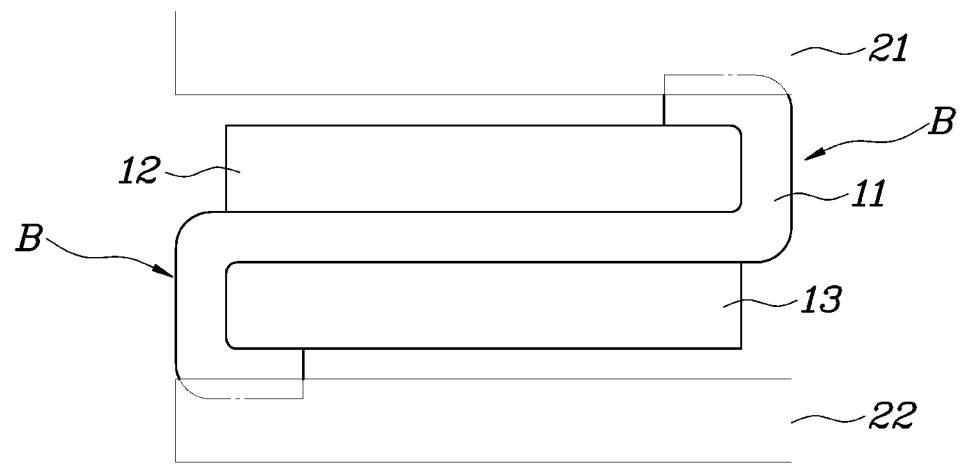
FIGS. 11A to 11C are cross-sectional views illustrating exemplary embodiments in which a membrane electrode assembly is integrated with gas diffusion layers.
Figure 11B:
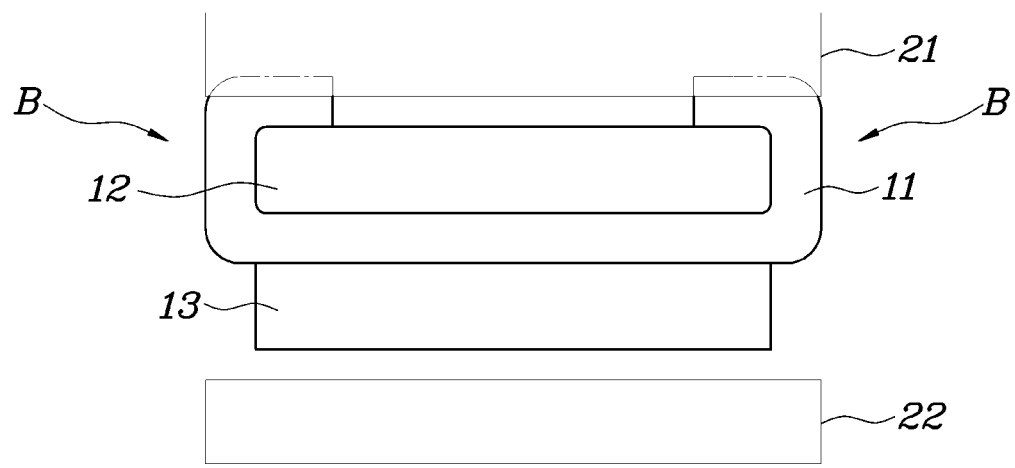
Figure 11C:
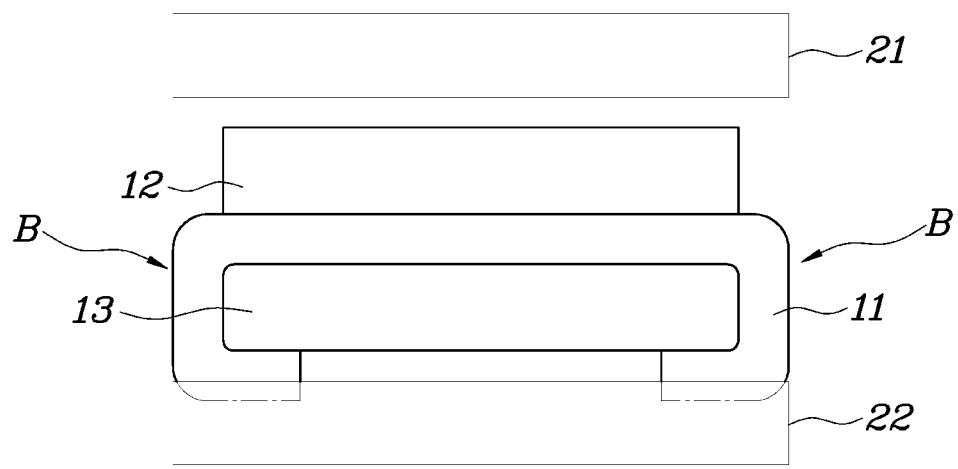

Next, FIGS. 11A to 11C illustrate structures in which a membrane electrode assembly 10 is integrated with gas diffusion layers 21 and 22 according to the embodiment of the present invention. FIG. 11A illustrates an example in which a polymer electrolyte membrane 11 of a membrane electrode assembly 10 is bent toward first upper and second lower electrode layers 12 and 13. FIG. 11B illustrates an example in which a polymer electrolyte membrane 11 of a membrane electrode assembly 10 is bent toward a first upper electrode layer 12. FIG. 11C illustrates an example in which a polymer electrolyte membrane 11 of a membrane electrode assembly 10 is bent toward a second lower electrode layer 13.

In FIGS. 11A to 11C, the gas diffusion layers 21 and 22 may be integrally bonded to the upper and lower portions of the membrane electrode assembly 10. For example, the gas diffusion layers 21 and 22 may be bonded by a hot pressing or a roll laminating process.

As illustrated in FIGS. 11A to 11C, the gas diffusion layers 21 and 22 may be bonded to the upper and lower surfaces of the membrane electrode assembly 10, i.e., to the upper and lower portions of the first electrode layer 12 and/or the second electrode layer 13 so as to realize self-humidification by supplying water molecules provided from the bent end (E) of the polymer electrolyte membrane 11 into the gas diffusion layers 21 and 22.

Figure 12A:
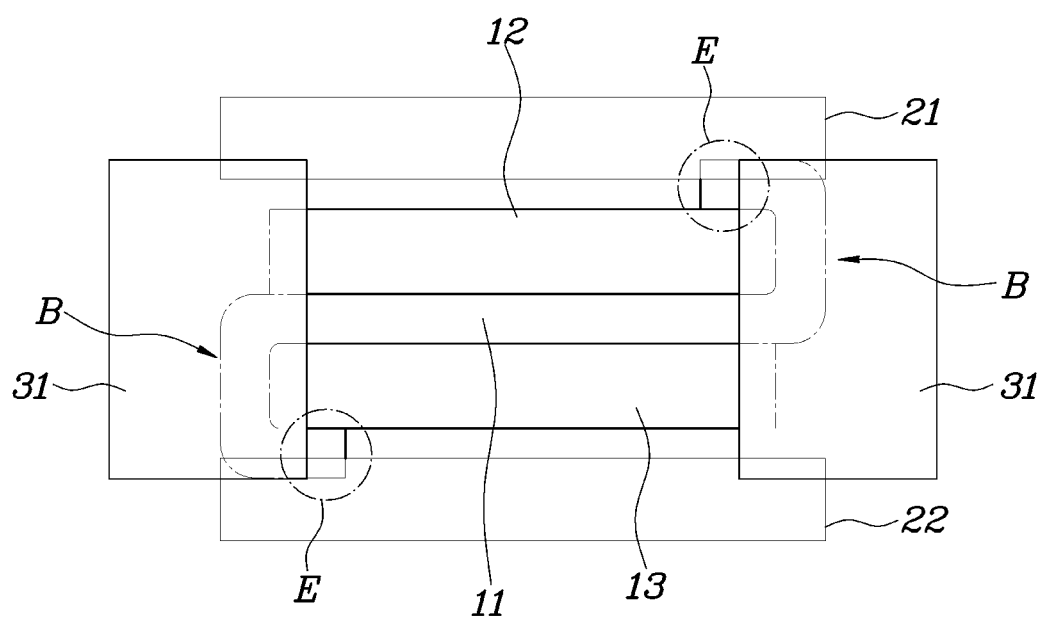
FIGS. 12A to 12C are cross-sectional views illustrating an exemplary embodiment in which a membrane electrode assembly, a sub-gasket, and gas diffusion layers are integrated with each other.
Figure 12B:
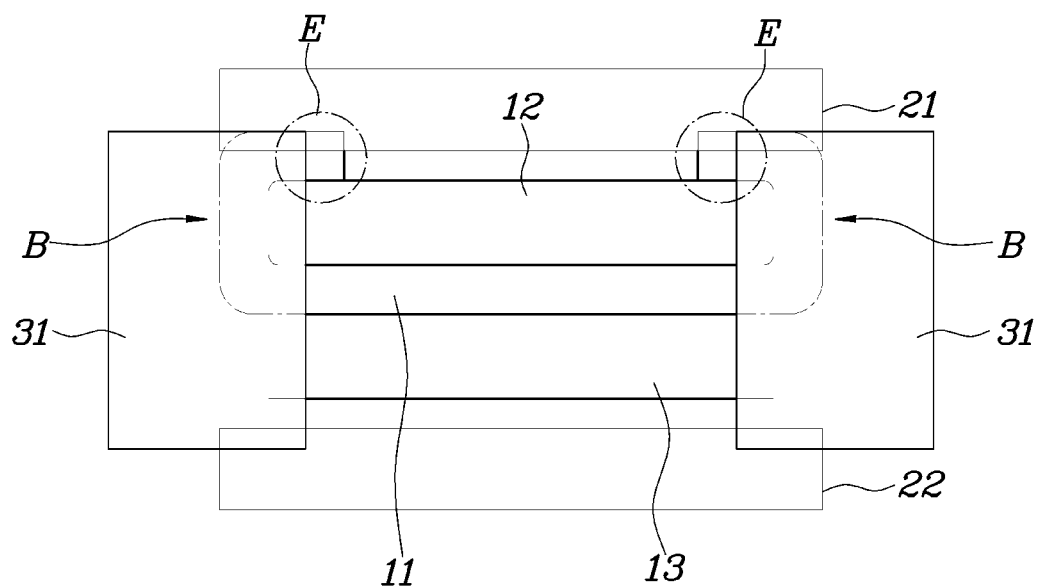
Figure 12C:
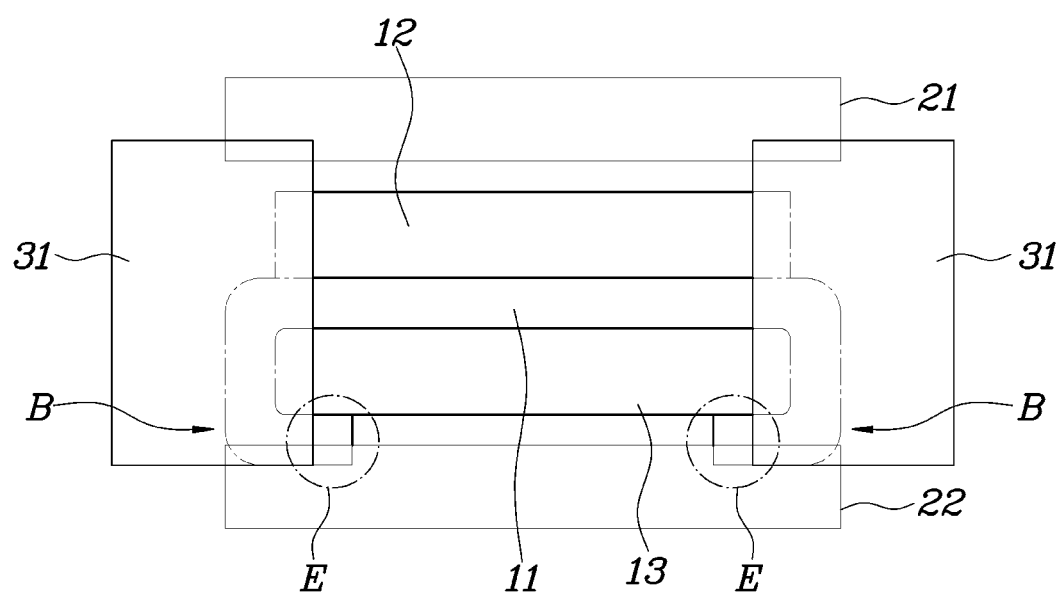

Next, FIGS. 12A to 12C illustrate structures in which a membrane electrode assembly 10, a sub-gasket 31, and gas diffusion layers 21 and 22 are integrated with each other according to the embodiment of the present invention. Each example illustrated in FIGS. 12A to 12C is to integrally bond the gas diffusion layers 21 and 22 to the upper and lower portions of the membrane electrode assembly 10 integrated with the sub-gasket 31 illustrated in FIGS. 10A to 10C. For example, the gas diffusion layers 21 and 22 may be bonded by a hot pressing or a roll laminating process.

As illustrated in FIGS. 12A to 12C, the gas diffusion layers 21 and 22 may be bonded to the upper and lower surfaces of the membrane electrode assembly 10, i.e., to the upper and lower portions of the first electrode layer 12 and/or the second electrode layer 13 so as to realize self-humidification by supplying water molecules provided from the bent end (E) of the polymer electrolyte membrane 11 into the gas diffusion layers 21 and 22.

Figure 13A:
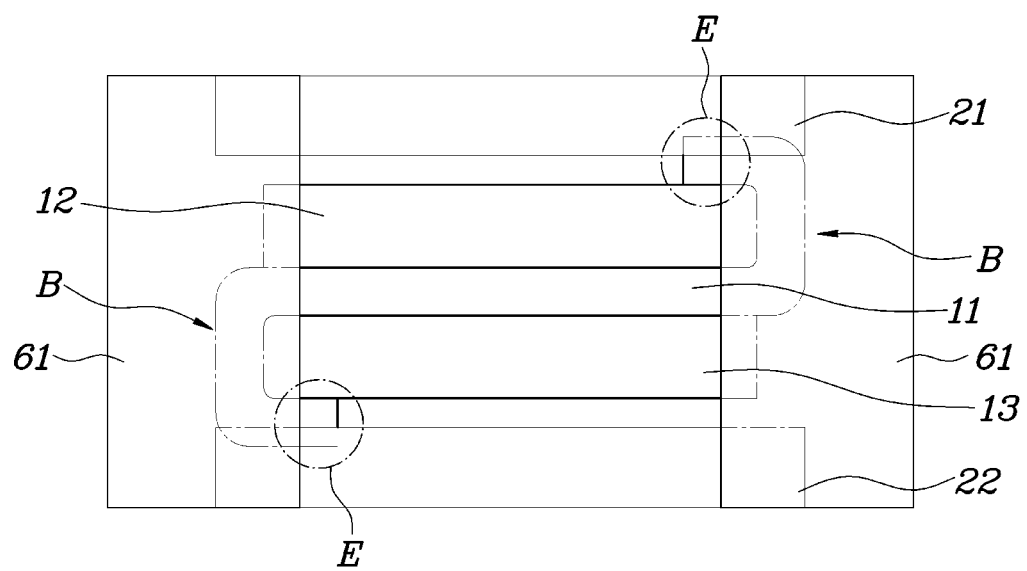
FIGS. 13A to 13C are cross-sectional views illustrating exemplary embodiments in which a membrane electrode assembly is integrated with a polymer frame.
Figure 13B:
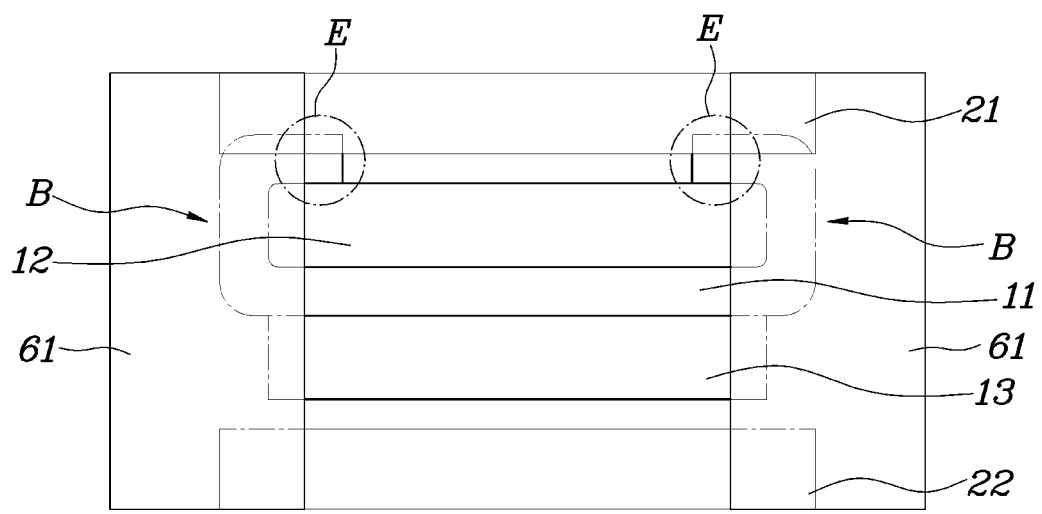
Figure 13C:
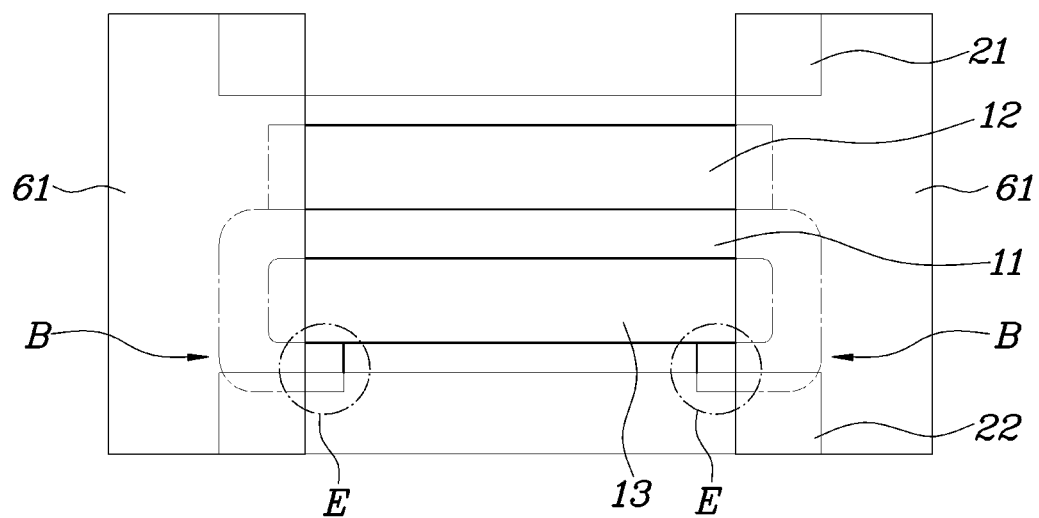

Next, FIGS. 13A to 13C illustrate another examples in which a membrane electrode assembly 10 is integrated with gas diffusion layers 21 and 22, and a structure in which the membrane electrode assembly 10 and the gas diffusion layers 21 and 22 are laterally fixed by a polymer frame. FIG. 13A illustrates an example in which a polymer electrolyte membrane 11 of a membrane electrode assembly 10 is bent toward first upper and second lower electrode layers 12 and 13. FIG. 13B illustrates an example in which a polymer electrolyte membrane 11 of a membrane electrode assembly 10 is bent toward a first upper electrode layer 12. FIG. 13C illustrates an example in which a polymer electrolyte membrane 11 of a membrane electrode assembly 10 is bent toward a second lower electrode layer 13.

In FIGS. 13A to 13C, the gas diffusion layers 21 and 22 may be integrally disposed in the upper and lower portions of the membrane electrode assembly 10, and the gas diffusion layers 21 and 22 and the membrane electrode assembly 10 may be integrated with each other by bonding separate frames 61 to the side ends of the disposed gas diffusion layers 21 and 22 and the membrane electrode assembly 10. For example, the frames 61 may be bonded by an injection molding process.

As illustrated in FIGS. 13A to 13C, the gas diffusion layers 21 and 22 may be bonded to the upper and lower surfaces of the membrane electrode assembly 10, i.e., to the upper and lower portions of the first electrode layer 12 and/or the second electrode layer 13 so as to realize self-humidification by supplying water molecules provided from the bent end (E) of the polymer electrolyte membrane 11 into the gas diffusion layers 21 and 22.

FIGS. 14A to 14D are top views illustrating various examples of positions in which a bent portion is formed in the fuel cell including a membrane electrode assembly according to exemplary embodiments. Each of FIGS. 14A to 14D illustrates the membrane electrode assembly 10 and a separator 42 disposed in the lower portion of a membrane electrode assembly 10. In FIGS. 14A to 14D, reference numeral "11" refers to a portion of a polymer electrolyte membrane 11 extending to the upper portion of a first electrode layer 12 in the state in which the polymer electrolyte membrane 11 is bent only to the upper portion of the first electrode layer 12.

Figure 14A:
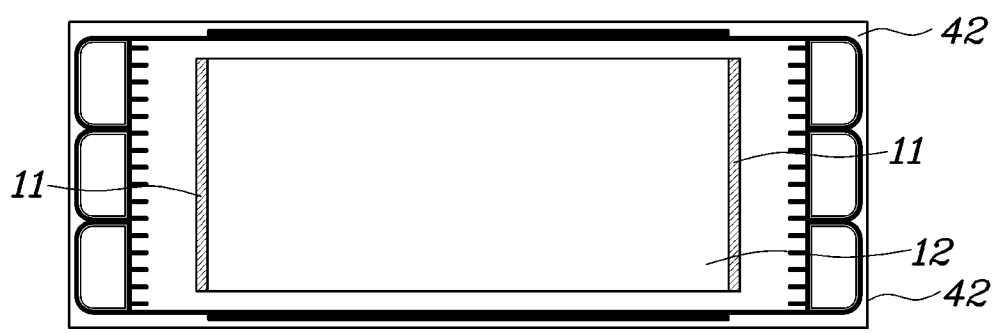
FIGS. 14A to 14D are top views illustrating various exemplary embodiments of positions in which a bent portion is formed in the fuel cell including a membrane electrode assembly.
Figure 14B:
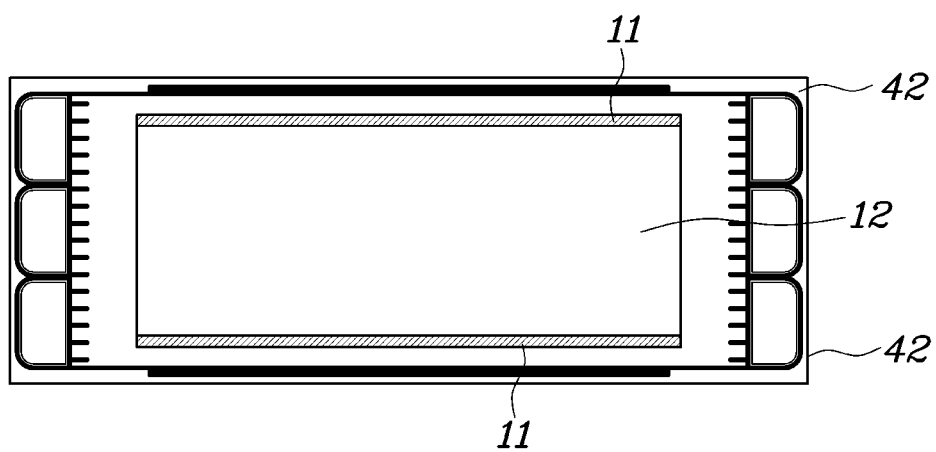
Figure 14C:
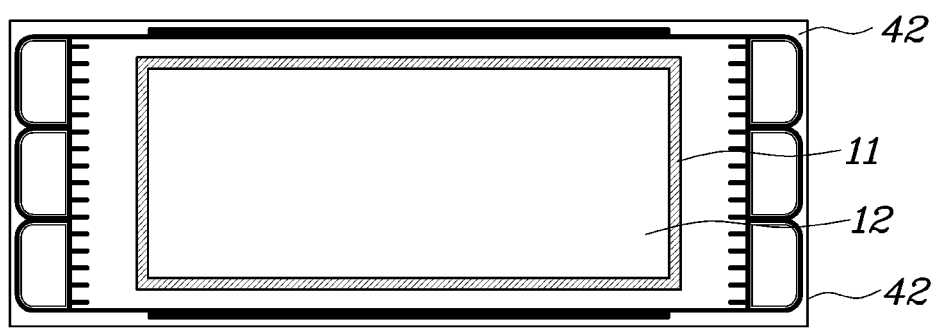
Figure 14D:
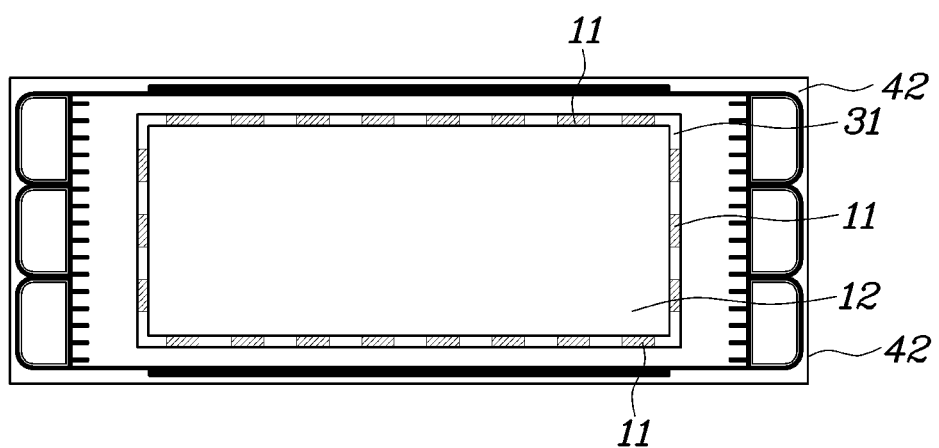

FIG. 14A illustrates a structure in which a portion of a polymer electrolyte membrane 11 facing the manifold portion of a separator 42 is bent. FIG. 14B illustrates a structure in which a portion of a polymer electrolyte membrane 11 facing the major axis of a separator 42, instead of a portion of the polymer electrolyte membrane 11 facing the manifold portion, is bent. FIG. 14C illustrates a structure in which a polymer electrolyte membrane 11 is bent along the overall edge of a membrane electrode assembly 10. FIG. 14D illustrates a structure in which a polymer electrolyte membrane 11 is selectively bent only in a partial region along the edge of a membrane electrode assembly 10 so as to adjust a supply amount of water molecules by self-humidification.

As is apparent from the above description, in accordance with the membrane electrode assembly and the fuel cell including the same according to exemplary embodiments in the present disclosure, water generated by the electromechanical reaction in the fuel cell can be autonomously supplied to the selected one of the anode and the cathode, or to both of the anode and the cathode. Therefore, it is possible to prevent olyte membrane 11 of a membrane electrode assembly 10 are bent (B) only to a first upper electrode layer 12 or only to In In addition, in accordance with the membrane electrode assembly and the fuel cell including the same according to the exemplary embodiments, moisture can be supplied without requiring an external humidifier to supply humidified air to the membrane electrode assembly. Therefore, costs can be reduced since the humidifier is unnecessary.

In addition, in accordance with the membrane electrode assembly and the fuel cell including the same according to the exemplary embodiments, it is possible to prevent water generated in the reaction region from diffusing outside of the unit cell through the electrolyte membrane. Therefore, it is possible to prevent a short circuit from occurring between a plurality of unit cells in the stack, and to prevent corrosion of the exterior of the stack due to moisture.

In addition, in accordance with the membrane electrode assembly and the fuel cell including the same according to the exemplary embodiments in the present disclosure, it is possible to reduce the size of the electrolyte membrane disposed in a region other than the reaction region in the related art by allowing the membrane electrode assembly to be arranged in the gasket of the separator. Therefore, it is possible to reduce costs in terms of materials.

In addition, in accordance with the membrane electrode assembly and the fuel cell including the same according to the exemplary embodiments, the sub-gasket can be integrated with the gas diffusion layers by a roll laminating or a thermal compression through hot pressing in the state in which the electrolyte membrane is bent.

In addition, in accordance with the membrane electrode assembly and the fuel cell including the same according to the exemplary embodiments, the unit cells can be integrated by bonding the gas diffusion layers to the electrolyte membrane in the state in which the electrolyte membrane is bent, and by forming the polymer frame using an injection molding. Therefore, it is possible to improve the productivity of the stack.

In addition, in accordance with the membrane electrode assembly and the fuel cell including the same according to the exemplary embodiments, the unit cells can be integrated with the membrane electrode assembly manufactured in a tailored form so as to be suitable for user's demand characteristics or the gas diffusion layers, even though the supply amount of moisture varies according to specifications of the stack and the operating system.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fuel cell comprising:
   a membrane electrode assembly
   including a polymer electrolyte membrane, a first electrode layer disposed on an upper surface of the polymer electrolyte membrane and a second electrode layer disposed on a lower surface of the polymer electrolyte membrane; and
   a first gas diffusion layer and a second gas diffusion layer disposed above the first electrode layer and below the second electrode layer, respectively,
   wherein at least one end of the polymer electrolyte membrane is bent upward along a side of the first electrode layer and extends to an upper surface of the first electrode layer, or is bent downward along a side of the second electrode layer and extends to a lower surface of the second electrode layer, and
   wherein the at least one end of the polymer electrolyte membrane is disposed between the first electrode layer and the first gas diffusion layer, or between the second electrode layer and the second gas diffusion layer.

2. The fuel cell according to claim 1, wherein the membrane electrode assembly and the first and second gas diffusion layers are integrally formed.

3. The fuel cell according to claim 1, wherein water molecules are supplied into the first and second gas diffusion layers from the at least one end of the polymer electrolyte membrane extending to the upper surface of the first electrode layer or the lower surface of the second electrode layer.

4. The fuel cell according to claim 1, further comprising a frame bonded to a lamination structure of the membrane electrode assembly and the first and second gas diffusion layers so as to fix the lamination structure.

5. The fuel cell according to claim 4, wherein the membrane electrode assembly, the first and second gas diffusion layers, and the frame are integrally formed.

6. The fuel cell according to claim 1, further comprising upper and lower separators disposed in respective upper and lower portions of the membrane electrode assembly, and comprising respective gaskets forming a sealed structure of the membrane electrode assembly.

7. The fuel cell according to claim 6, wherein the membrane electrode assembly is disposed inside the sealed structure formed by the gaskets.

8. The fuel cell according to claim 1, further comprising a sub-gasket formed in an edge region of the membrane electrode assembly.

9. The fuel cell according to claim 8, wherein the sub-gasket seals a side of the membrane electrode assembly, and the bent end of the polymer electrolyte membrane extending to an upper or lower surface of the first or second electrode layer is exposed to the outside of the sub-gasket.

10. The fuel cell according to claim 8, wherein the membrane electrode assembly and the sub-gasket are integrally formed.

11. The fuel cell according to claim 1, wherein a first end of the polymer electrolyte membrane is bent upward along the side of the first electrode layer and extends to the upper surface of the first electrode layer, and a second end of the polymer electrolyte membrane is bent downward along the side of the second electrode layer and extends to the lower surface of the second electrode layer.

12. The fuel cell according to claim 11, wherein the sides of the first and second electrode layers are aligned vertically with the first and second ends of the polymer electrolyte membrane respectively adjacent thereto.

13. The fuel cell according to claim 1, wherein one end of the polymer electrolyte membrane is bent upward to extend to the upper surface of the first electrode layer or downward to extend to the lower surface of the second electrode layer.

14. The fuel cell according to claim 1, wherein two ends of the polymer electrolyte membrane are bent in the same direction so as to extend to the upper surface of the first electrode layer or the lower surface of the second electrode layer.

15. The fuel cell according to claim 1, wherein at least one end of the polymer electrolyte membrane is horizontally divided into upper and lower portions, the upper portion being bent upward along the side of the first electrode layer and extending to the upper surface of the first electrode layer, and the lower portion being bent downward along the side of the second electrode layer and extending to the lower surface of the second electrode layer.

16. The fuel cell according to claim 1, wherein:
   the polymer electrolyte membrane comprises a first electrolyte membrane facing the first electrode layer and a second electrolyte membrane facing the second electrode layer; and
   at least one end of the first electrolyte membrane is bent upward along the side of the first electrode layer and extends to the upper surface of the first electrode layer, and at least one end of the second electrolyte membrane is bent downward along the side of the second electrode layer and extends to the lower surface of the second electrode layer.

17. A membrane electrode assembly comprising:
   a first electrode layer;
   a second electrode layer;
   a polymer electrolyte membrane disposed between the first electrode layer and the second electrode layer; and
   a first gas diffusion layer and a second gas diffusion layer disposed above the first electrode layer and below the second electrode layer, respectively,
   wherein a first end of the polymer electrolyte membrane is bent upward around a side end of the first electrode layer so as to extend to an upper surface of the first electrode layer, the first end being disposed between the first electrode layer and the first gas diffusion layer; and/or
   wherein a second end of the polymer electrolyte membrane is bent downward around a side end of the second electrode layer so as to extend to a lower surface of the second electrode layer, the second end being disposed between the second electrode layer and the second gas diffusion layer.

* * * * *